US012354377B2

(12) United States Patent
Tanikawa et al.

(10) Patent No.: US 12,354,377 B2
(45) Date of Patent: Jul. 8, 2025

(54) IMAGE RECOGNITION APPARATUS, DRIVER ASSISTANCE SYSTEM AND IMAGE RECOGNITION METHOD

(71) Applicant: DENSO CORPORATION, Kariya (JP)

(72) Inventors: Ukyo Tanikawa, Nisshin (JP); Yasushi Suehisa, Kariya (JP)

(73) Assignee: DENSO CORPORATION, Kariya (JP)

( * ) Notice: Subject to any disclaimer, the term of this patent is extended or adjusted under 35 U.S.C. 154(b) by 439 days.

(21) Appl. No.: 17/538,723

(22) Filed: Nov. 30, 2021

(65) Prior Publication Data
US 2022/0172491 A1 Jun. 2, 2022

(30) Foreign Application Priority Data

Dec. 2, 2020 (JP) ................................ 2020-200350

(51) Int. Cl.
*G06V 20/56* (2022.01)
*B60W 30/18* (2012.01)
*G06V 20/58* (2022.01)

(52) U.S. Cl.
CPC ..... *G06V 20/588* (2022.01); *B60W 30/18163* (2013.01); *G06V 20/582* (2022.01);
(Continued)

(58) Field of Classification Search
CPC .... G06V 20/588; G06V 20/582; G06V 10/82; B60W 30/18163; B60W 2420/403; B60W 2554/4045; B60W 2555/60; B60W 2050/146; B60W 2552/53; B60W 30/12; G08G 1/09623; G08G 1/0112; G08G 1/0962; G08G 1/096783; G08G 1/09; G08G 1/09626; G05B 2219/32128; G05B 23/0272; G06T 7/00; G06T 2207/30252; G06T 7/70; G01C 21/3658
See application file for complete search history.

(56) References Cited

U.S. PATENT DOCUMENTS 5,999,877 A * 12/1999 Takahashi .............. G06V 20/54
340/916
2013/0101174 A1 4/2013 Meis et al.
(Continued)

FOREIGN PATENT DOCUMENTS

JP 2004206275 A 7/2004
JP 2019-075133 A 5/2019

*Primary Examiner* — Sumati Lefkowitz
*Assistant Examiner* — Aaron Joseph Sorrin
(74) *Attorney, Agent, or Firm* — Maschoff Brennan

(57) ABSTRACT

An image recognition apparatus comprises an image information acquirer that acquires image information in a given cycle by capturing an image of a traveling path along which an own vehicle travels, a road sign recognizer that recognizes a road sign based on the image information and a traffic lane recognizer that recognizes traffic lanes located in the traveling path based on the image information. A memory is provided in the image recognition apparatus to store traffic lane information about a traffic lane recognized by the traffic lane recognizer in a time series. A determiner is also provided to determine if the road sign recognized by the road sign recognizer is for an own traffic lane by choosing a most suitable traffic lane among the traffic lanes recognized for a given period based on the traffic lane information stored in the time series.

6 Claims, 5 Drawing Sheets

(52) U.S. Cl.
CPC ............... *B60W 2420/403* (2013.01); *B60W 2554/4045* (2020.02); *B60W 2555/60* (2020.02)

(56) References Cited

U.S. PATENT DOCUMENTS

| | | | |
|---|---|---|---|
| 2014/0152829 A1* | 6/2014 | Suzuki | G06V 20/584 |
| | | | 348/148 |
| 2016/0350606 A1* | 12/2016 | Yoshitomi | G06V 20/588 |
| 2017/0154527 A1* | 6/2017 | Yoshitomi | G08G 1/096783 |
| 2017/0236414 A1 | 8/2017 | Nishimura | |
| 2018/0253612 A1 | 9/2018 | Koyama et al. | |
| 2019/0276022 A1 | 9/2019 | Bae et al. | |
| 2019/0347940 A1* | 11/2019 | Endo | G08G 1/167 |

\* cited by examiner

IMAGE RECOGNITION APPARATUS, DRIVER ASSISTANCE SYSTEM AND IMAGE RECOGNITION METHOD

CROSS-REFERENCE TO RELATED APPLICATION

This patent application is based on and claims priority to Japanese Patent Application No. 2020-200350, filed on Dec. 2, 2020 in the Japan Patent office, the entire disclosure of which is hereby incorporated by reference herein.

BACKGROUND

Technical Field

The present disclosure relates to an image recognition apparatus, a driver assistance system and an image recognition method.

Related Art

A known vehicle system mounted on an own vehicle recognizes road signs placed on a traveling road, where the own vehicle travels, based on a camera image captured by an in-vehicle camera mounted thereon. Such a system generally appropriately recognizes respective road signs even if the traveling road along which the own vehicle travels has multiple traffic lanes.

Usually, a motorway, such as a highway, etc., has a branch road for a vehicle to exit from the motorway to an ordinary road. Hence, to encourage deceleration of a vehicle, a road sign is often placed above the branch road to indicate a speed limit different from that for the motorway.

Accordingly, since such a branch road is generally separated from the motorway along which the vehicle travels, it becomes difficult for the vehicle as time goes by to detect the branch road from a camera image taken by the vehicle. However, even when it becomes difficult for the vehicle to detect the branch road, since a road sign is often placed above the branch road, the road sign of the branch road can unavoidably be detected (i.e., recognized).

In such a situation, a conventional system sometimes erroneously detects the road sign placed above the branch road as a road sign for a traveling road along which an own vehicle travels.

In view of this, the present disclosure is made to address and resolve the above-described problem, and it is a principal object thereof to provide an image recognition apparatus and an image recognition method capable of appropriately recognizing road signs.

SUMMARY

Accordingly, one aspect of the present disclosure provides a novel image recognition apparatus that comprises an image information acquirer that acquires image information in a given cycle by capturing an image of a traveling path along which an own vehicle travels, a road sign recognizer that recognizes a road sign based on the image information and a traffic lane recognizer that recognizes traffic lanes located in the traveling path based on the image information. A memory is provided in the image recognition apparatus to store traffic lane information about a traffic lane periodically recognized by the traffic lane recognizer in a time series. A determiner is also provided in the image recognition apparatus to determine if the road sign recognized by the road sign recognizer is for an own traffic lane by choosing a most suitable traffic lane among the traffic lanes periodically recognized for a given period based on the traffic lane information stored in the time series.

Another aspect of the present disclosure provides a novel image recognition method executed by an image recognition apparatus. The method comprises the steps of: acquiring image information by capturing an image of a traveling path along which an own vehicle travels in a given cycle as an image information acquisition step; recognizing a road sign based on the image information as a road sign recognition step; and recognizing traffic lanes in the traveling path based on the image information as a traffic lane recognition step. The method further comprises the steps of: storing traffic lane information about the traffic lanes recognized in the traffic lane recognition step in a time series as a storage step; and determining if the road sign recognized in the road sign recognition step is for the own traffic lane as a determination step by choosing the most suitable traffic lane among the traffic lanes recognized for a given period based on the traffic lane information stored in a time series.

Another aspect of the present disclosure provides a novel driver assistance system that comprises a camera to capture an image of a traveling path along which an own vehicle travels in a given cycle and the above-described image recognition apparatus. The driver assistance system further comprises a display to display at least the road sign for the own traffic lane.

Hence, with the above-described configuration, even if a traffic lane becomes unrecognizable based on an image captured by the in-vehicle camera, since traffic lane information thereof is stored in time series, a traffic lane corresponding to the road sign can be appropriately chosen as long as the traffic lane becomes unrecognizable anymore within a given period.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
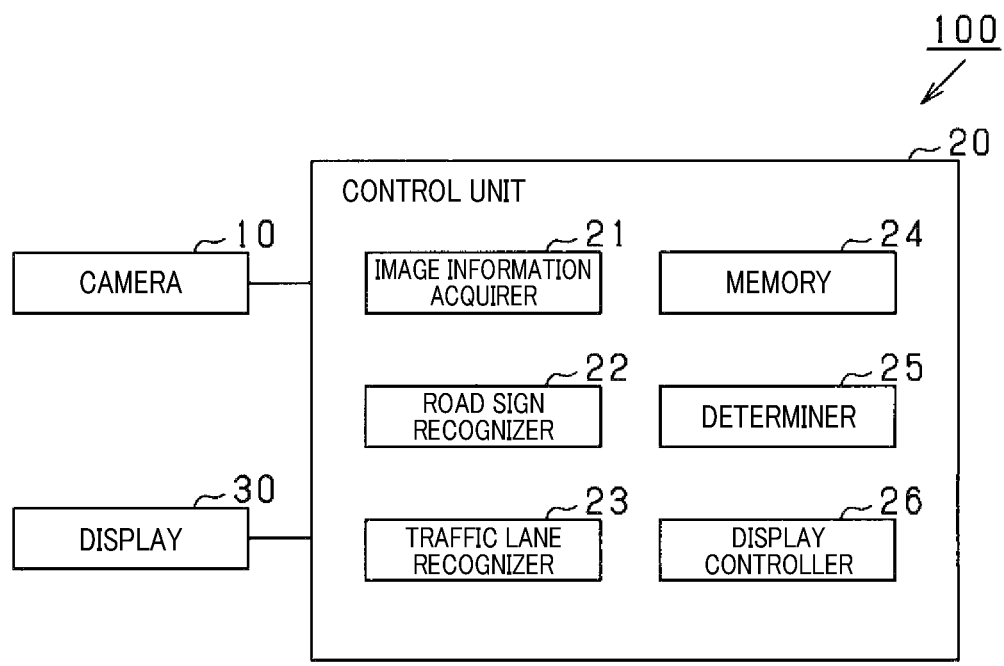
FIG. 1 is a block diagram illustrating a configuration of a driver assistance system according to one embodiment of the present disclosure.

Hereinbelow, various embodiments of an image recognition apparatus and a method for recognizing an image according to the present disclosure will be described with reference to applicable drawings, wherein like reference numerals designate identical or corresponding parts throughout the several views thereof. In the below described embodiments and variants, devices identical or equivalent to each other are accompanied by the same sign, and description of the device is incorporated in the same device with the same sign.

Initially, a driver assistance system to which an image recognition apparatus of one embodiment of the present disclosure is adopted will be described with reference to FIG. 1 and applicable drawings. First, a driver assistance system 100 is employed in a vehicle and performs various driver assistances.

For example, as shown in FIG. 1, the driver assistance system 100 comprises a monocular camera 10 as a photographing device, a control unit 20 as an image recognition apparatus, and a display device 30. The control unit 20 is connected to the camera 10 to communicate with each other. The camera 10 employs an imaging device, such as a CCD (Charge Coupled Device), a CMOS (Complementary Metal Oxide Semiconductor), etc. The camera 10 is disposed inside of the vehicle, for example, near an upper end of a windshield thereof, and captures images of surroundings of the vehicle including a road (i.e., a traveling path) extending forward from the vehicle. Hence, images captured by the camera 10 are then output to the control unit 20. Here, the camera 10 can be composed of multiple camera units (e.g., a compound-eyed camera).

The control unit 20 is a computer composed of a CPU (Central Processing Unit), a memory, such as a ROM (Read Only Memory), a RAM (Random Access Memory), etc., and an I/O (Input/Output) interface or the like. The control unit 20 has various functions as described below. For example, the control unit 20 acts as an image information acquirer 21, a road sign recognizer 22, and a traffic lane recognizer 23. The control unit 20 also acts as a memory 24, a determiner 25, and a display controller 26.

Such various functions are performed by running given program stored in the ROM or the like included in the control unit 20. The control unit 20 is configured to recognize a traveling path, along which an own vehicle travels, based on an image captured and output a result of the recognition. The various functions can be either wholly achieved by either an electronic circuit of hardware or at least partially achieved by software (i.e., a process executed by a computer). These various functions performed by the control device 20 will be described later in more detail. Further, the control unit 20 is connected to a display device 30 provided in the vehicle, and controls the display device 30 to display the result of the recognition and various information thereon.

Next, the various functions performed by the control unit 20 will be herein below described more in detail.

First, the image information acquirer 21 acquires information of an image captured by the camera 10 in a given cycle. The road sign recognizer 22 then recognizes a road sign in the image captured and acquired by the image information acquirer 21. Specifically, the road sign recognizer 22 determines a type of the road sign placed ahead of the own vehicle based on the image as acquired and dictionary information previously prepared for use in identifying road signs. The dictionary information used in identifying the road signs is prepared per type of a road sign, such as a guidance sign, a warning sign, a regulatory sign, an instruction sign, an auxiliary sign, etc., and is previously stored in a memory, such as a ROM, etc.

The road sign recognizer 22 determines the type of the road sign by comparing the image as captured with the dictionary information by applying pattern matching therebetween. Further, based on the image as captured and the dictionary information, the road sign recognizer 22 also acquires positional information of the road sign both in a traveling direction of the own vehicle and a lateral direction substantially orthogonally intersecting the traveling direction. However, a method of recognizing the road sign is not limited to this, and may be arbitrarily modified. For example, machine learning, such as a deep neural network (DNN), etc., can be used in recognizing the type of the road sign.

Further, the traffic lane recognizer 23 first detects a road edge of a traveling path, along which the own vehicle travels, based on an image captured and acquired by the image information acquirer 21. Based on the image as captured and acquired, the traffic lane recognizer 23 also detects traffic lane division lines, such as white solid lines, white broken lines, yellow solid lines, so-called zebra zones, etc., which divide the traveling path into multiple traffic lanes. The so-called zebra zones generally prohibit entrance of a vehicle and guide the vehicle in a given direction. Specifically, the traffic lane recognizer 23 extracts points of changes in contrast of a luminance caused between the traffic lane division line separating the traffic lanes and a road surface (i.e., a degree of edge intensity) from the image as captured as edge candidate points. Subsequently, the traffic lane recognizer 23 extracts a candidate line of the traffic lane division line from a series of the edge candidate points as extracted. More specifically, the traffic lane recognizer 23 continuously processes images as captured in a given sampling cycle, and extracts multiple points, at which a luminance sharply changes in a lateral direction in the image, as edge candidate points. Subsequently, the traffic lane recognizer 23 applies Hough conversion to such multiple edge candidate points as extracted to obtain sequences of edge candidate points. The traffic lane recognizer 23 then extracts a candidate line having left and right outlines each composed of a sequence of the edge candidate points as acquired. The traffic lane recognizer 23 also extracts other candidate lines in this way and obtains multiple candidate lines.

Subsequently, for each of the edge candidate points constituting each of the multiple candidate lines, the traffic lane recognizer 23 calculates a degree of presence of characteristics to serve as a traffic lane division line that separates traffic lanes. Subsequently, the traffic lane recognizer 23 detects a candidate line having the largest degree of presence of the characteristics as a traffic lane division line that divides the traveling path 70 into the traffic lanes.

Here, when detecting the traffic lane division line, it is desirable that the traffic lane recognizer 23 recognizes a type of the traffic lane division line. The type of the traffic lane division line may be recognized based on a color, arrangement, and a shape of the traffic lane division line or the like. In such a situation, machine learning may be used. Further, the traffic lane recognizer 23 also detects the road edge in the same way by which the traffic lane recognizer 23 detects the traffic lane division line. The road edge is not limited to a traffic lane division line, such as a white line, etc., but also includes a boundary of a road (i.e., road surface), such as a curbstone, a guardrail, a median, etc.

Further, the traffic lane recognizer 23 is enabled to recognize an area of a traffic lane, a type of the traffic lane, and positional information of the traffic lane based on the road edge and the traffic lane division line as recognized. For example, as the type of a traffic lane, an own traffic lane along which an own vehicle travels, an adjacent traffic lane adjacent to the own traffic lane, along which a vehicle runs in the same direction as the own vehicle travels, and an on-coming traffic lane along which a vehicle travels in an opposite direction are exemplified. Also exemplified as the type of a traffic lane are a branch traffic lane (i.e., branch road) that branches off from a traveling path along which an own vehicle travels, a confluence traffic lane that merges with the traveling path where the vehicle travels, and a parallel road arranged along the traveling path where the own vehicle travels. Further exemplified as the type of a traffic lane is a crossing traffic lane or a crossing road intersecting with the own traffic lane or the like. Here, the positional information of the traffic lane represents a coordinate of a center in a widthwise direction of the traffic lane area.

Hence, the traffic lane recognizer 23 may identify a traveling path along which the own vehicle travels based on road edges as recognized. More specifically, the traffic lane recognizer 23 detects multiple road edges and recognizes left and right road edges accommodating the own vehicle near to the own vehicle as road edges of the traveling path along which the own vehicle travels. Subsequently, the traffic lane recognizer 23 recognizes a traffic lane area and positional information of the traffic lane in the traveling path along which the own vehicle runs, based on the traffic lane division line as recognized. At the same time, the traffic lane recognizer 23 recognizes a type of the traffic lane based on a type of the traffic lane division line and a shape of the traffic lane division line or the like.

Specifically, the traffic lane recognizer 23 detects multiple traffic lane division lines and recognizes left and right traffic lane division lines accommodating the own vehicle in close proximity to the own vehicle as own traffic lane division lines that defines the own traffic lane. Subsequently, the traffic lane recognizer 23 recognizes an area between the left and right traffic lane division lines as a traffic lane area of the own traffic lane, and classifies the traffic lane area as the own traffic lane. The traffic lane recognizer 23 also recognizes a coordinate of a center between the left and right traffic lane division lines in a lateral direction as positional information of the own traffic lane.

Further, the traffic lane recognizer 23 recognizes a type of another traffic lane as an adjacent traffic lane when the traffic lane recognizer 23 can detect and identify multiple traffic lane division lines in the traveling path, along which the own vehicle travels, and such another traffic lane extends parallel to the own traffic lane. In such a situation, when the traffic lane division line that divides the traveling path into the own traffic lane and the adjacent traffic lane is composed of a white broken line or other vehicles travel in the adjacent traffic lane in the same direction as the own vehicle running in the own traffic lane, the traffic lane recognizer 23 regards such conditions as confirmation data that affirms the recognition that the type of the traffic lane as identified is the adjacent traffic lane. Further, the traffic lane recognizer 23 recognizes a traffic lane area of the adjacent traffic lane and recognizes a coordinate of a center between left and right traffic lane division lines in a widthwise direction of the traffic lane area of the adjacent traffic lane as positional information of the adjacent traffic lane.

By contrast, even if it can be confirmed that multiple traffic lanes are present in the traveling path along which the own vehicle travels, and other traffic lanes extend parallel to the own traffic lane, when a traffic lane division line defining a traffic lane as a recognition target is composed of either a yellow solid line indicating that the traffic lane as defined is an oncoming traffic lane, or a median, the traffic lane recognizer 23 decides that the traffic lane is not the adjacent traffic lane. The traffic lane recognizer 23 similarly decides that the traffic lane is not the adjacent traffic lane when other vehicles travel in the traffic lane as the recognition target in an opposite direction to that in which the own vehicle travels along the own traffic lane. In these situations, the traffic lane recognizer 23 regards such a condition as confirmation data that affirms the recognition that the traffic lane as the identification target is an oncoming traffic lane. Further, the traffic lane recognizer 23 recognizes that another traffic lane is likely to be an oncoming traffic lane when a traveling path other than that along which the own vehicle travels cannot be confirmed (i.e., detected) and such another traffic lane extends parallel to the own traffic lane in the traveling path along which the own vehicle travels.

Further, when a traffic lane as a type identification target leaves from either the own traffic lane or the adjacent traffic lane, the traffic lane recognizer 23 recognizes the type of the traffic lane as a branch traffic lane. In such a situation, when the traffic lane division line defining the traffic lane as the identification target indicates a so-called central zebra zone or when bifurcation of a traffic lane is confirmable based on a shape of the traffic lane division line, the traffic lane recognizer 23 regards such a situation as data that affirms the recognition that the traffic lane is a branch traffic lane. Further, when the traffic lane recognizer 23 recognizes the branch traffic lane in this way, the traffic lane recognizer 23 then recognizes a traffic lane area of the branch traffic lane and recognizes a coordinate of a center between left and right traffic lane division lines in a widthwise direction of the traffic lane area of the branch traffic lane as positional information of the branch traffic lane.

Similarly, when a traffic lane merges with either the own traffic lane or the adjacent traffic lane thereto, the traffic lane recognizer 23 identifying a type of each of the traffic lanes recognizes that the traffic lane as identified is a confluence traffic lane. In such a situation, when the traffic lane division line defining such a traffic lane indicates the so-called zebra zone or a confluence of such a traffic lane can be confirmed based on a shape of the traffic lane division line, the traffic lane recognizer 23 regards such a situation as data that affirms the recognition that the traffic lane is a confluence traffic lane. Further, when the traffic lane recognizer 23 has recognized the confluence traffic lane, the traffic lane recognizer 23 subsequently recognizes a traffic lane area of the confluence traffic lane and recognizes a coordinate of a center between left and right traffic lane division lines in a widthwise direction of the traffic lane area of the confluence traffic lane as positional information of the confluence traffic lane.

Further, when the traffic lane recognizer 23 has recognized that a running path extends outside of a road edge of the traveling path along which the own vehicle travels in parallel to the traveling path, the traffic lane recognizer 23 recognizes that the traveling path located outside is a parallel road. In such a situation, when it is confirmed that other vehicles travel along the traveling path located outside in the same direction as the own vehicle, the traffic lane recognizer 23 regards such an event as data that affirms the recognition that the traveling path located outside is the parallel road.

Further, when the traffic lane recognizer 23 has recognized the parallel road, the traffic lane recognizer 23 recognizes a traffic lane area of the parallel road and a coordinate of a center between left and right traffic lane division lines or a road edge in a widthwise direction of the traffic lane area of the parallel road as positional information of the parallel road.

Further, when another traffic lane intersects the own traffic lane, the traffic lane recognizer 23 recognizes such another traffic lane as a crossing road. When the traffic lane recognizer 23 has recognized the crossing road, the traffic lane recognizer 23 then recognizes a traffic lane area of the crossing road and recognizes a coordinate of a center between traffic lane division lines or road edges in a widthwise direction of the traffic lane area of the crossing road as positional information of the crossing road.

A traffic lane recognition method is not limited to that as described heretofore and may arbitrarily be modified. Further, machine learning such as deep neural network (DNN), etc., may be used in recognizing a type of a traffic lane. In the present disclosure, the oncoming traffic lane, the confluence traffic lane, and the parallel road are recognized in addition to the crossing road. However, these are not necessarily recognized.

Further, the memory 24 such as a RAM, etc., stores recognition results, such as positional information, types of a traffic lane, etc., generated by the traffic lane recognizer 23 in a time series. That is, the memory 24 stores the recognition results in association with either a recognition time or a time when an image is taken.

The determiner 25 determines if a road sign recognized by the road sign recognizer 22 corresponds to the own traffic lane by choosing a traffic lane most suitable for the road sign among traffic lanes as detected. A determination method performed by the determiner 25 will be described later more in detail.

The display controller 26 controls the display device 30 to display a road sign corresponding to the own traffic lane thereon based on a determination result generated by the determiner 25.

Figure 2:
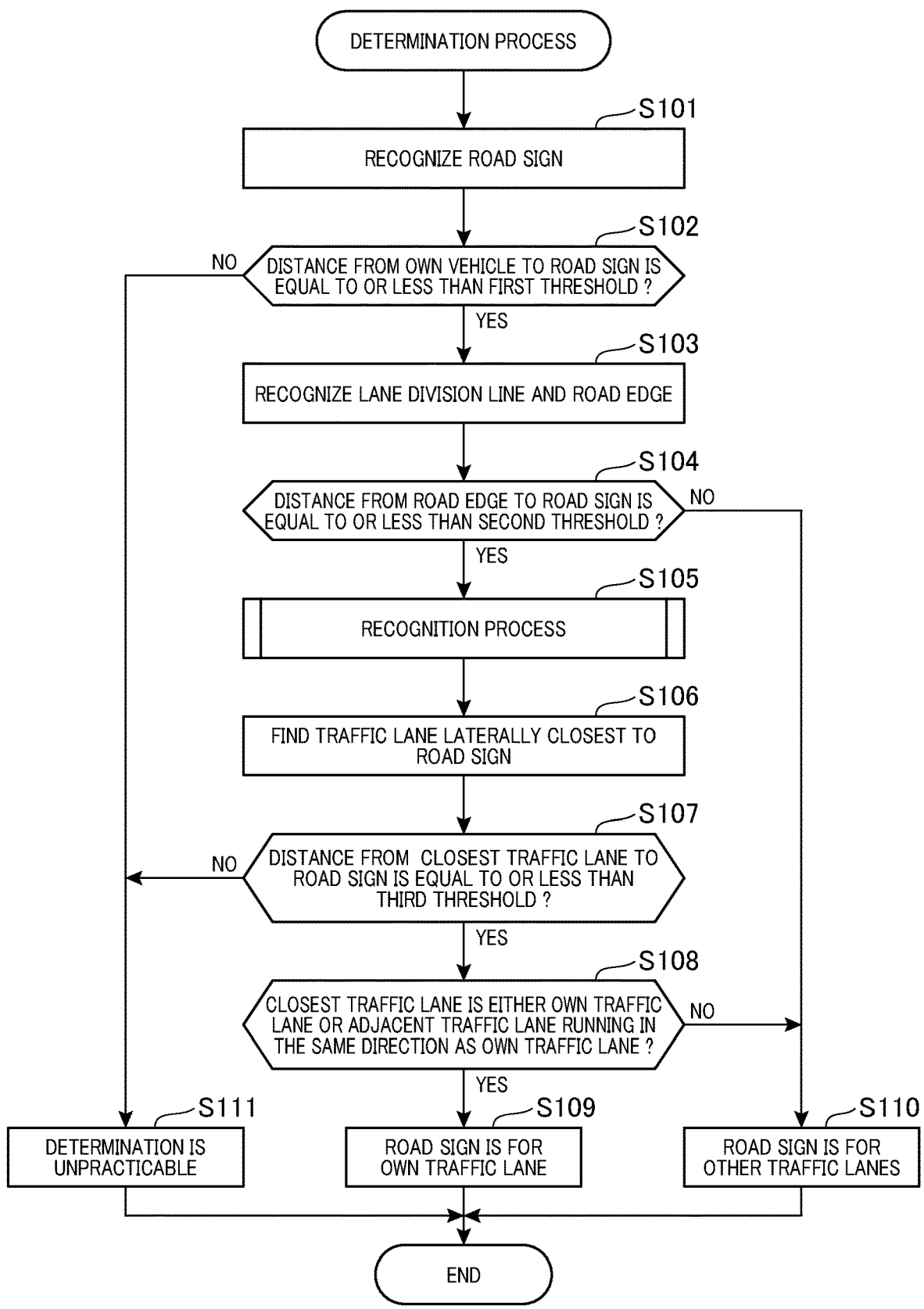
FIG. 2 is a flowchart that illustrates a sequence of a determination process according to one embodiment of the present disclosure.
Figure 3:
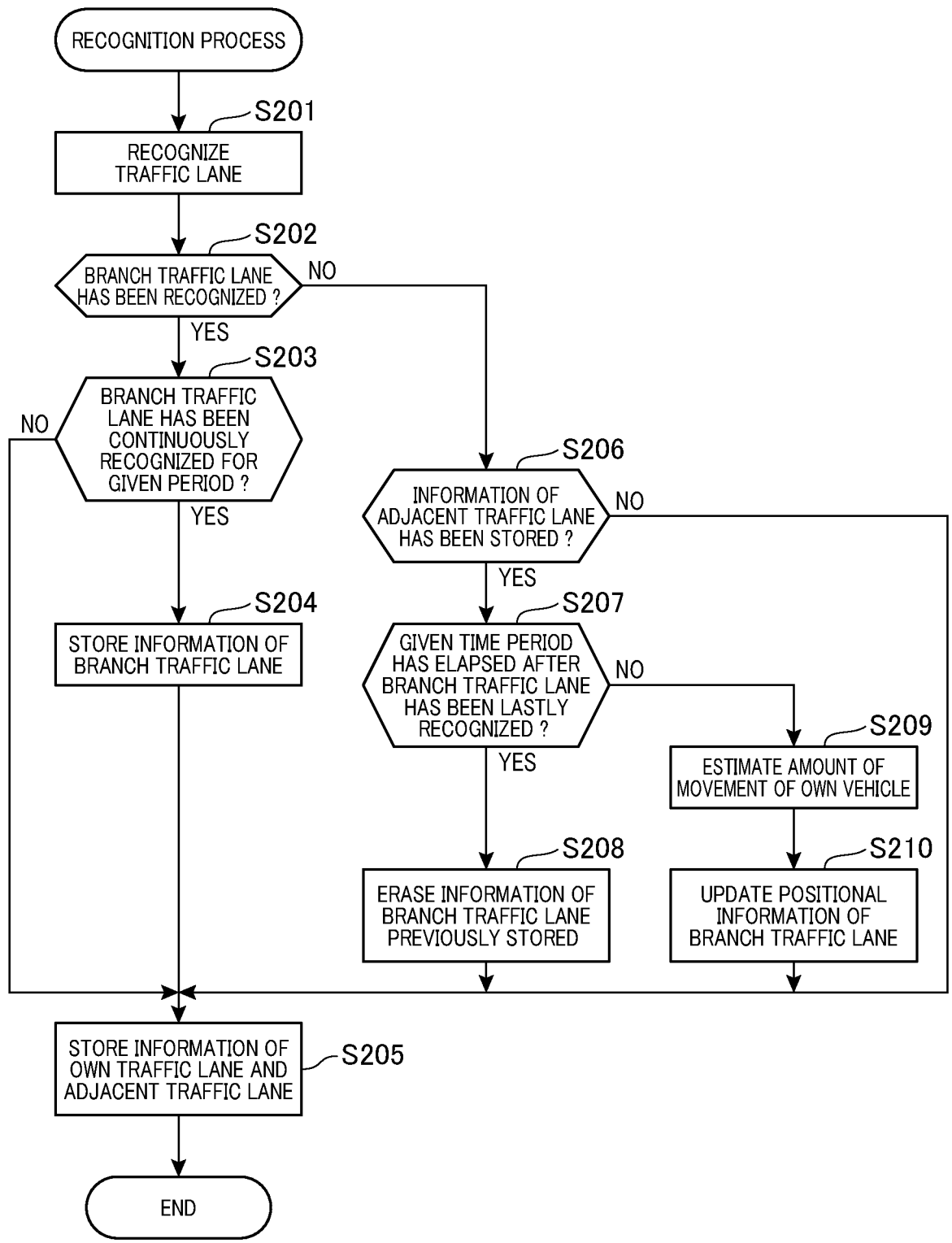
FIG. 3 is also a flowchart illustrating a sequence of a recognition process according to one embodiment of the present disclosure.

Next, a determination process for determining a traffic lane most preferably corresponding to a road sign recognized by the road sign recognizer 22 will be described with reference to FIGS. 2 and 3. Here, the determination process is repeatedly executed by the control unit 20 in a given cycle, for example, per frame.

First, the control unit 20 acquires an image captured by the camera 10 therefrom and recognizes a road sign based on the image as captured in step S101. At this moment, the control unit 20 recognizes the type and the positional information of the road sign as described earlier. Hence, since the control unit 20 performs a process of step S101, the control unit 20 can function as an image information acquirer 21 in the present disclosure. The control unit 20 also functions as a road sign recognizer 22. Accordingly, the step S101 serves as both an image information acquisition step and a road sign recognition step.

Next, the control unit 20 determines if a distance from an own vehicle to the road sign recognized in step S101 (i.e., a distance in a traveling direction) is less than or equal to a first threshold in step S102. Here, an arbitrary value, for example, one of values ranging from 30 m to 200 m can be designated to the first threshold value. However, the first threshold can be changed in accordance with a vehicle speed or a type of a traveling path (e.g., a motorway). Further, when multiple road signs have been recognized in step S101, the process of step S102 is executed per road sign serving as a determination target, separately. Further, in such a situation (i.e., the multiple road signs have been recognized as determination targets in step S101), each of the following steps is similarly executed per road sign as the determination target, separately.

Further, when a determination result is negative in step S102 (No, in step S102), that is, the distance to the road sign is greater than the first threshold, the control unit 20 determines that a traffic lane corresponding to the road sign cannot be determined (hereinafter referred to as impracticable determination) in step S111. Subsequently, the control unit 20 stores such a determination result (hereinafter referred to as a result of impracticable determination) in the memory 24 and terminates the determination process.

By contrast, when a determination result is positive in step S102 (Yes, in step S102), that is, the distance to the road sign is less than or equal to the first threshold, the control unit 20 recognizes the traffic lane division lines and the road edges in step S103. As described earlier, in step S103, the control unit 20 detects the type of the traffic lane division line in addition to the traffic lane division lines and the road edges.

Subsequently, the control unit 20 compares positional information of the road edge of the traveling road along which the own vehicle travels with positional information of the road sign as a determination target, and determines if a distance from the road edge to the road sign in a lateral direction is less than or equal to a second threshold value in step S104. That is, it is determined if the road sign is located within a given distance range from the road edge as a reference. Here, when multiple road edges are present, determination is made for each of the road edges. Further, any one of values ranging from 1 m to 4 m can be designated to the second threshold.

When the determination result is negative in step S104 (No, in step S104), that is, the distance from the road edge of the traveling road, along which the own vehicle travels, to the road sign is greater than the second threshold value, the control unit 20 determines that the road sign as the determination target is for another traffic lane in step S110. At the same time, the control unit 20 stores the determination result (hereinafter referred to as the determination result for other traffic lanes) in the memory 24 in step S110. Subsequently, the control unit 20 terminates the determination process.

By contrast, when a determination result is positive in step S104 (Yes, in step S104), that is, the distance from any one of the road edges to the road sign is less than or equal to the second threshold, the control unit 20 performs a recognition process of recognizing traffic lane information based on the traffic lane division lines and the road edges in step S105. The recognition process recognizes a traffic lane area, a traffic lane type, positional information of a traffic lane as traffic lane information and stores the traffic lane information.

Herein below, the recognition process performed in step S105 will be described more in detail with reference to FIG. 3. Specifically, as shown there, the control unit 20 first detects and recognizes traffic lane information composed of traffic lane areas, traffic lane types, and positional information of traffic lanes based on the traffic lane division lines and the road edges as described earlier in step S201. In such a situation, the control unit 20 classifies and recognizes at least an own vehicle traffic lane, an adjacent traffic lane, and a branch traffic lane. Hence, due to this step S201, the control unit 20 can function as a traffic lane recognizer 23 in the present disclosure. Accordingly, the step S201 serves as a traffic lane recognition step.

Next, the control unit 20 determines in step S202 if the control unit 20 has recognized the branch traffic lane in step S201. If the determination result is positive in step S202 (Yes, in step S202), the control unit 20 then determines if the branch traffic lane has continuously been recognized for a given period (i.e., over multiple frames) in step S203. Hence, the control unit 20 is configured to store time information, such as a time when the control unit 20 has recognized the branch traffic lane for the first time, etc., in the memory 24 when the control unit 20 has recognized the branch traffic lane in step S201. The time information will continuously be stored in the memory 24 as long as the control unit 20 continuously recognizes the branch traffic lane. That is, when the branch traffic lane is not recognized in step S201 on and after the next determination process, the time information of the branch traffic lane stored in the memory 24 is erased.

Further, when a determination result is positive in step S202 (Yes, in step S202), the control unit 20 stores the traffic lane area of the branch traffic lane and the positional information of the branch traffic lane in the memory 24 in step S204. Here, when previous positional information of the branch traffic lane has already been stored in the memory 24, the positional information of the branch traffic lane is updated based on the determination result of recognition performed in step S201. Hence, due to this step S204, the control unit 20 can function as the memory 24 in the present disclosure. Accordingly, the step S204 serves as a storage step.

Further, either when a determination result is negative in step S203 (No, in step S203) or when a process of step S204 is completed, the control unit 20 stores positional information of the own traffic lane in the memory in step S205. At the same time, when an adjacent traffic lane is present, the control unit 20 stores positional information indicating the adjacent traffic lane as well in the same step. Subsequently, the recognition process is terminated and the process goes to step S106 in which a determination process is performed.

By contrast, when the determination result is negative in step S202 (No, in step S202), that is, the branch traffic lane is not recognized in step S201, the control unit 20 determines if the positional information of the branch traffic lane has been stored in the memory 24 in step S206. That is, the control unit 20 determines if the process of step S204 has been performed in previous determination processes and the positional information of the branch traffic lane has already been stored in the memory 24.

If a determination result is negative in step S206 (No, in step S206), the control unit 20 proceeds to step S205. By contrast, when the determination result is positive in step S206 (Yes, in step S206), that is, the positional information of the branch traffic lane has been stored in the memory 24, the control unit 20 then determines in step S207 if a given period has elapsed after the branch traffic lane is most lately recognized. That is, the control unit 20 determines if a given period has elapsed after the branch traffic lane becomes no longer recognizable, which is after the positional information of the branch traffic lane has been stored in step S204. Hence, time information, such as a time when positional information of the branch traffic lane is stored is stored in the memory 24. Subsequently, the control unit 20 determines if the given period has elapsed from the time when the positional information of the branch traffic lane is most lately stored based on the time information. Hence, if the determination result is positive in step S207 (Yes, in step S207), that is, the branch traffic lane is not recognized for the given period from the time when the positional information of the branch traffic lane is most lately stored, the control unit 20 erases the positional information of the branch traffic lane in step S208. Subsequently, the process goes to step S205.

By contrast, when the determination result is negative in step S207 (No, in step S207), that is, a given period has not elapsed after the branch traffic lane becomes no longer recognizable, the control unit 20 estimates, in step S209, an amount of lateral movement caused by the own vehicle after the control unit 20 has executed a previous determination process. Specifically, the control unit 20 calculates the amount of movement in the lateral direction based on an execution cycle of the determination process, a velocity of the own vehicle, and an angular velocity of the own vehicle during turning or the like. In view of this, the control unit 20 is configured to acquire information necessary in calculating the amount of movement, such as a velocity of the own vehicle detected by a speed sensor, an angular velocity detected by a yaw rate sensor, etc. Further, in step S209, the control unit 20 also detects a direction of movement in the lateral direction of the own vehicle.

Subsequently, in step S210, the control unit 20 updates the positional information of the branch traffic lane stored in the memory 24 based on the amount of lateral movement and the direction of movement respectively estimated and detected in step S209. That is, since the positional information of the branch traffic lane is specified by a relative position defined relative to the own vehicle, the positional information of the branch traffic lane is updated based on the amount of movement and the direction of movement of the own vehicle providing a reference. Subsequently, the process goes to step S205.

Next, processes performed after step S106 in the determination process of FIG. 2 will be hereinbelow described with reference to FIG. 2. When the recognition process of step S105 is completed, the control unit 20 detects a traffic lane located at a shortest distance in the lateral direction from (i.e., closest to) the road sign acting as a determination target in step S106. Specifically, in step S106, the control unit 20 detects the traffic lane located at the shortest distance from the road sign based on positional information of the own traffic lane stored in the memory 24, positional information of the adjacent traffic lane, and positional information of the branch traffic lane in step S105.

Subsequently, the control unit 20 determines if a distance between the traffic lane located at the shortest distance from (i.e., closest to) the road sign and the road sign specified in step S106 is less than or equal to the third threshold in step S107. Here, to the third threshold, any one of values ranging from 1 m to 3 m is optionally designated, for example.

When a determination result is positive in step S107 (Yes, in step S107), the control unit 20 determines if the traffic lane specified in step S106 is either the own traffic lane or the adjacent traffic lane running in the same direction in step S108. When a determination result is positive in step S108 (Yes, in step S108), the control unit 20 determines that the road sign as a determination target is for the own traffic lane, and stores the determination result (hereinafter simply referred to as a determination result for an own traffic lane) in the memory 24 in step S109. Subsequently, the control unit 20 terminates the determination process.

By contrast, when the determination result is negative in step S108 (No, in step S108), the control unit 20 determines that the road sign as a determination target is for another traffic lane (e.g., other than the own traffic lane and the adjacent traffic lane), and stores the determination result (hereinafter simply referred to as a determination result for other traffic lanes) in step S110. Subsequently, the control unit 20 terminates the determination process.

Further, when the determination result in step S107 is negative (No, in step S107), the control unit 20 determines that a traffic lane corresponding to the road sign as a determination target cannot be determined (hereinafter simply referred to as a determination-not-possible determination), and stores the determination result (hereinafter simply referred to as a result of a determination-not-possible determination) in step S111. Subsequently, the control unit 20 terminates the determination process. Hence, since it performs steps S106 to S108, the control unit 20 can function as the determiner 25 in the present disclosure. Accordingly, steps S106 to S108 correspond to a determination step in the present disclosure. Hence, by performing the determination process in this way, the control unit 20 uses an image recognition method as described heretofore in the present disclosure.

Further, after completing the determination process, the control unit 20 performs a majority decision vote based on multiple determination results obtained in multiple determination processes, thereby obtaining an ultimate determination result. Specifically, the control unit 20 acquires a given number of past determination results, for example one of from about 10 to about 30 determination results, retroactively from the latest determination result in order. Subsequently, the control unit 20 ultimately decides or determines that the road sign as a determination target is for the own traffic lane when the number of determination results for the own traffic lane is greater than each of the number of determination results for the other traffic lane and the number of determination results indicating the determination-not-possible determination, respectively, among the determination results associated with the road sign as a determination target. In this way, when the control unit 20 ultimately determines that the road sign as a determination target is for the own traffic lane, the control unit 20 control the display device 30 to display the road sign as a determination target.

By contrast, the control unit 20 ultimately determines that the road sign as a determination target does not correspond to the own traffic lane when the number of determination results for the own traffic lane is less than or equal to the number of determination results for other traffic lanes or the number of determination results indicating the determination-not-possible determination. In such a situation, the control unit 20 does not control the display device 30 to display the road sign as a determination target.

Next, operation and/or function performed during the above-described determination process will be herein below described with reference to FIGS. 4 to 7. First, it is assumed that a road sign 60 is a determination target indicating a speed limit of 60 km/h. It is also assumed that a distance L1 from the own vehicle 50 to the road sign 60 is below the first threshold value. It is further assumed that a distance L2 from the road sign 60 to each of road edges 71a and 74 (i.e., a guardrail on the left) of a traveling path 70 of the own vehicle 50 is equal to or less than the second threshold value. It is also assumed that a distance L3 from positional information (e.g., a coordinate of a center P10) of a branch traffic lane 83 to the road sign 60 is within a range of the third threshold value.

Figure 4:
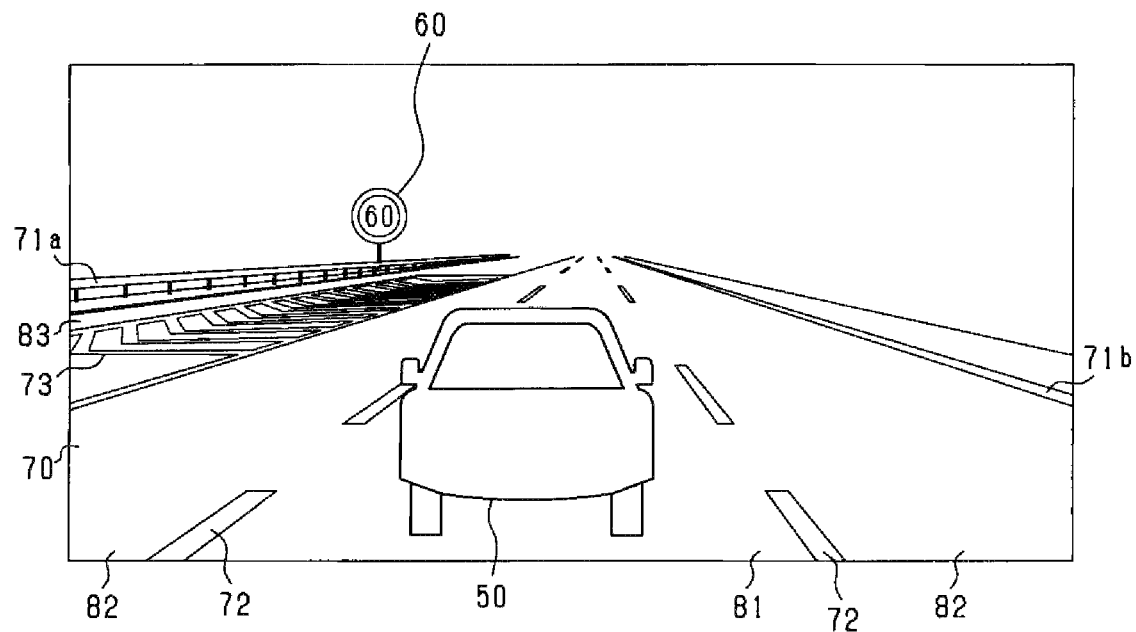
FIG. 4 is a schematic diagram illustrating an image captured by an in-vehicle camera according to one embodiment of the present disclosure.

Further, as shown by an image of FIG. 4 as captured, the traveling path 70 along which the own vehicle 50 travels is composed of an own traffic lane 81, an adjacent traffic lane 82, and a branch traffic lane 83. Further, the road sign 60 for the branch traffic lane 83 is in a recognizable condition. At the same time, the road edge 71a on the left of the traveling path 70, the road edge 71b on the right of the traveling path 70, and traffic lane division lines 72 separating the own traffic lane 81 from the adjacent traffic lanes 82 can also be recognized. A so-called zebra zone 73 can also be recognized therein.

Figure 6:
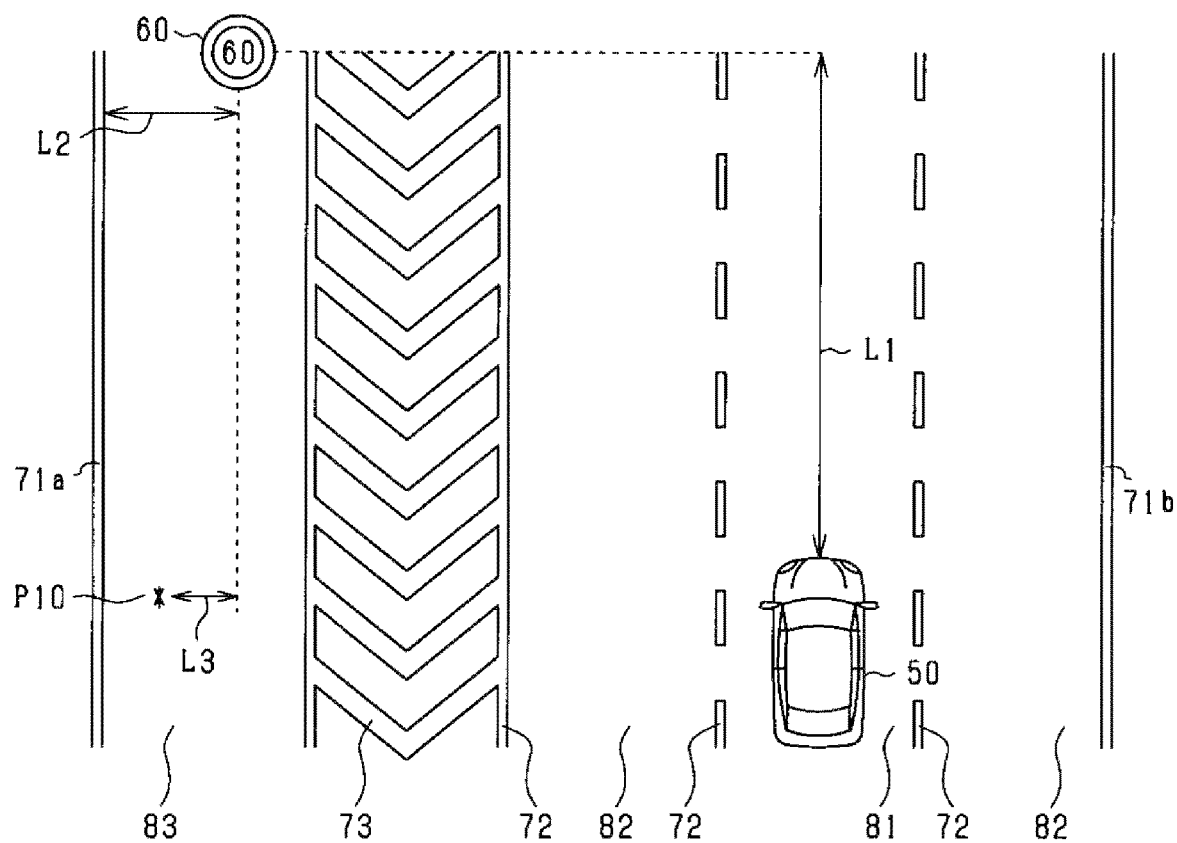
FIG. 6 is a diagram illustrating a positional relation between each of traffic lanes and a road sign according to one embodiment of the present disclosure.
Figure 7:
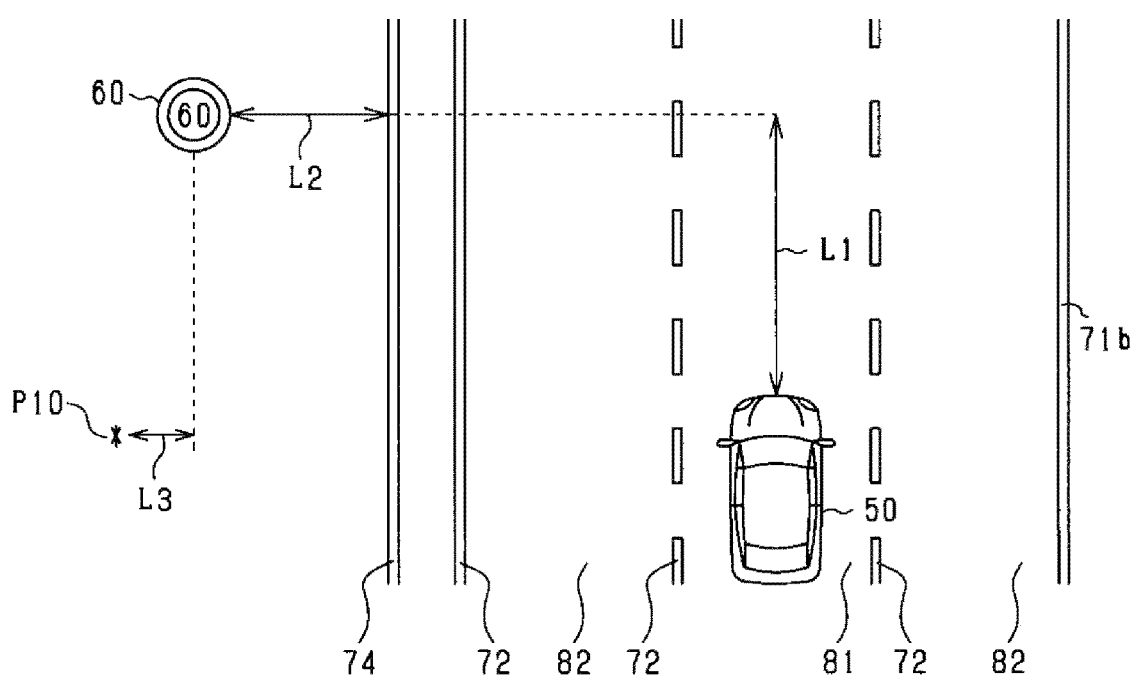
FIG. 7 also is a diagram illustrating another positional relation between each of the traffic lanes and the road sign established later according to one embodiment of the present disclosure.

Hence, as shown in FIG. 6 which is a bird's-eye view of FIG. 4, the control unit 20 can recognize the own traffic lane 81, the adjacent traffic lanes 82, and the branch traffic lane 83 based on the image of FIG. 4 as captured. Accordingly, the control unit 20 can also recognize the positional information of each of the traffic lanes based thereon. Hence, after the control unit 20 has continuously recognized the branch traffic lane for a given period (i.e., multiple frames), the control unit 20 recognizes based on the premises as described earlier that the road sign 60 is for the branch traffic lane.

Figure 5:
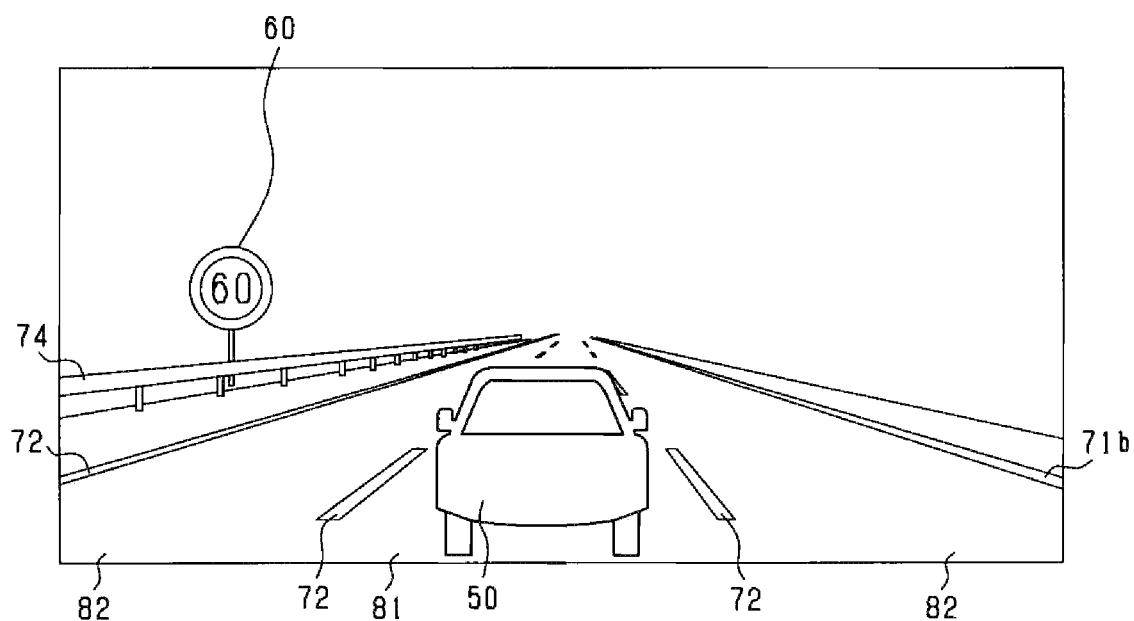
FIG. 5 is a schematic diagram illustrating another image captured later by the in-vehicle camera according to one embodiment of the present disclosure.

Further, FIG. 5 illustrates an image captured from the own vehicle after the own vehicle runs forward for a given time period from a position as shown in FIG. 4. As show there, even if it is recognizable that the traveling path 70 along which the own vehicle travels has the own traffic lane 81 and the adjacent traffic lanes 82, the branch traffic lane 83 cannot be recognized due to the road edge 74, such as a guardrail, etc. However, in the image as captured, the road sign 60 for the division traffic lane 83, now disappeared, is still recognizable. Similarly, in the image of FIG. 5 as captured, the road edge 74 (e.g., a left side guardrail) on the left of the traveling path 70, the road edge 71b on the right thereof, and the traffic lane division lines 72 separating the own traffic lane 81 from the adjacent traffic lanes 82 are also recognizable.

Hence, in such a situation, as long as the road sign 60 is recognized based only on the image of FIG. 5 as captured, when a distance from either a left side adjacent traffic lane 82 or the own traffic lane 81 to the road sign 60 is relatively short (i.e., these are relatively close to each other), the road sign 60 may be misrecognized as being for the own traffic lane 81.

However, according to the determination process of this embodiment, the positional information of the branch traffic lane is continuously stored in the memory 24 for a given period after the branch traffic lane 83 becomes no longer recognizable (see steps S206 to S210). Accordingly, as long as it is before elapse of a given period after the branch traffic lane 83 becomes unrecognizable, it can be recognized that the road sign 60 is for the branch traffic lane 83 (i.e., not for the own traffic lane) due to the premises as described earlier.

Next, various advantages obtained by this embodiment will be herein below described.

First, a road sign in a branch traffic lane is often placed above the branch traffic lane as shown in FIG. 4. For this reason, as described earlier, even if the branch traffic lane becomes separated from the traveling path of the own vehicle as the own vehicle runs forward and is concealed by the guardrail or the like, thereby becoming no longer recognizable in the image as captured as shown in FIG. 5, only the road sign for the branch traffic lane can continuously be recognized therein. Accordingly, in such a situation, depending on a position of the road sign for the branch road, it can be erroneously recognized as a road sign for the own traffic lane.

In view of this, the control unit 20 recognizes and stores traffic lane information about traffic lanes in a time series, and determines if the road sign is for the own traffic lane by choosing a traffic lane most suitable for the road sign among traffic lanes as recognized for a given period based on the traffic lane information stored in the time series. Specifically, in the determination process of this embodiment, the positional information of the branch traffic lane is continuously stored in the memory until the given period has elapsed from when the branch traffic lane 83 becomes no longer recognized (see steps S206 to S210). Subsequently, the control unit 20 selects the traffic lane most suitably corresponding to the road sign based on the positional information of the own traffic lane, the adjacent traffic lane, and the branch traffic lane stored in the memory. Hence, even if the branch traffic lane becomes no longer recognizable in the image as captured, it can be appropriately recognized that the road sign located above the branch traffic lane is for the branch traffic lane.

The control unit 20 selects the traffic lane for which the road sign is most suitable by comparing the positional information of the road sign with the positional information of each of the traffic lanes. More specifically, the control unit 20 detects the traffic lane located at the shortest distance from the road sign as a determination target among positional information of the own traffic lane, positional information of the adjacent traffic lane, and positional information of the branch traffic lane stored in the memory. Subsequently, the control unit 20 selects the most suitable traffic lane corresponding to the road sign by determining if the distance between the identified traffic lane (i.e., the traffic lane having the shortest distance from the road sign) and the road sign is below the third threshold. Hence, it is possible to appropriately determine if the road sign is for the own traffic lane.

Further, after the branch traffic lane becomes unrecognizable, the control unit 20 corrects the positional information of the branch traffic lane based on an amount of movement of the own vehicle, and compares the positional information as corrected, with the positional information of the road sign. That is, even after the branch traffic lane 83 becomes no longer recognizable, an amount of movement of the own vehicle is estimated and positional information of the branch traffic lane 83 is updated by performing the determination process in steps S209 and S210. For this reason, even if the own vehicle moves laterally, possibility of misrecognizing a position of the branch traffic lane 83 can be reduced or suppressed. Accordingly, it is possible to appropriately determine if the road sign is for the own traffic lane.

Further, the control unit 20 repeatedly determines if the road sign is for the own traffic lane for a given period, and makes the ultimate determination based on a majority decision (i.e., majority vote). Specifically, the control unit 20 acquires multiple determination results, for example, from about 10 to about 30 determination results, retroactively from the latest determination result in order. Then, the control unit 20 ultimately determines that the road sign as a determination target is for the own traffic lane when the number of determination results indicating the own traffic lane is greater than the number of determination results indicating the other traffic lanes and the number of determination results indicating a determination-not-possible determination among determination results acquired in association with the road sign. With this, it is possible to appropriately determine if the road sign is for the own traffic lane.

Further, the control unit 20 also determines that the road sign is for the own traffic lane, if the traffic lane most suitably corresponding to the road sign is either the own traffic lane or the adjacent traffic lane running in the same direction as the own traffic lane. With this, it is possible to appropriately determine if the road sign is for the own traffic lane.

Next, other embodiments and variants obtained by modifying at least a part of the above-described embodiment will be hereinbelow described with reference to applicable drawings.

First, in the above-described embodiment, the positional information of the branch traffic lane is stored for a given period, and the branch traffic lane is regarded as one of the traffic lane selection targets corresponding to the road sign. However, the present disclosure is not limited thereto and positional information about a confluence traffic lane can be stored for the given period as same as the branch traffic lane. That is, the confluence traffic lane can be one of traffic lane selection targets corresponding to the road sign as a first variant.

As another variant, positional information about the parallel road can be stored for the given period as same as the branch traffic lane. That is, the parallel road can be one of the traffic lane selection targets corresponding to the road sign. As yet another variant, positional information about the crossing traffic lane can be stored for the given period as same as the branch traffic lane. That is, the crossing traffic lane can be one of the traffic lane selection targets corresponding to the road sign. Further, two or more positional information among information of the branch traffic lane, the confluence traffic lane, the parallel road, and the crossing traffic lane can be stored for the given period. That is, these two or more traffic lanes can be one of the traffic lane selection targets corresponding to the road sign.

Secondly, the process performed in step S203 of the above-described embodiment can be omitted. That is, positional information of the branch traffic lane can be stored in step S204 when the branch traffic lane is recognized (Yes, in step S202) without determining if the branch traffic lane has been continuously recognized for a given period in step S203.

Thirdly, the processes of steps S209 and S210 performed in the above-described embodiment can be omitted. That is, an amount of movement of the own traffic lane may be estimated, but the positional information of the branch traffic lane may not be corrected.

Fourthly, in the above-described embodiment, the control unit 20 provides the ultimate determination result based on the majority decision vote. However, the present disclosure is not limited thereto, and a result of determination can be displayed as is.

Fifthly, in step S208 of the above-described embodiment, the amount of movement of the own vehicle can be estimated based on a change in characteristic point caused in images as captured in a time series.

Sixthly, the control unit and the control method described in the present disclosure may be realized by a dedicated computer provided by including a processor programmed to perform multiple functions and a memory. Alternatively, the control unit and the control method described in the present disclosure may be realized by a dedicated computer provided by including a processor configured by including one or more dedicated hardware logic circuits. Yet alternatively, the control unit and the control method described in the present disclosure may be realized by one or more dedicated computers each composed of a combination of a processor programmed to perform multiple functions and a memory and a processor composed of one or more hardware logic circuits. Further, the computer program may be stored in a computer-readable non-transitory tangible recording medium as an instruction carried out by a computer.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described image recognition apparatus and may be altered as appropriate. Further, the present disclosure is not limited to the above-described image recognition method and may be altered as appropriate. Further, the present disclosure is not limited to the above-described driver assistance system and may be altered as appropriate.

What is claimed is:

1. An image recognition apparatus installed in a vehicle, the image recognition apparatus comprising:
    an image information acquirer configured to acquire image information in a given cycle by repeatedly capturing an image of a traveling path along which an own vehicle travels;
    a road sign recognizer configured to recognize a plurality of road signs located along the traveling path based on the image information;
    a traffic lane recognizer configured to recognize traffic lanes located along the traveling path based on the image information;
    a storage device configured to store information about the traffic lanes recognized by the traffic lane recognizer as traffic lane information in a time series;
    a display device; and
    a determiner configured to:
        determine that the road sign recognizer recognizes a road sign located along the traveling path;
        determine that the traffic lane recognizer no longer recognizes a branch lane included in the traffic lanes;
        determine that a time period has elapsed since the traffic lane recognizer has last recognized the branch lane;
        detect a traffic lane among the traffic lanes that is located a shortest distance from the road sign;
        determine that the road sign is an own road sign that corresponds to an own lane of the own vehicle and not the branch lane; and
        display, on the display device, the own road sign of the own lane,
    wherein
    the image recognition apparatus serves as a driver assistance system that performs driver assistance.

2. The image recognition apparatus as claimed in claim 1, wherein the traffic lane information includes positional information about each of the traffic lanes recognized by the traffic lane recognizer,
    wherein the determiner compares, for each of the plurality of road signs, positional information about a corresponding one of the plurality of road signs with the positional information about each of the traffic lanes recognized by the traffic lane recognizer to accordingly choose, for each of the plurality of road signs, one of the traffic lanes to correspond to one of the plurality of road signs.

3. The image recognition apparatus as claimed in claim 2, wherein the positional information of each of the traffic lanes includes a relative position defined relative to the own vehicle,
    wherein the determiner corrects positional information of a given traffic lane in accordance with an amount of movement of the own vehicle caused after the given traffic lane is no longer recognized by the traffic lane recognizer based on the image information,
        the given traffic lane being previously recognized by the traffic lane recognizer based on the image information for a given period and the positional information thereof being stored in the storage device,
        the given traffic lane being no longer recognized currently by the traffic lane recognizer based on the image information,
    wherein the determiner compares the positional information about each of the plurality of road signs with the positional information about each of the traffic lanes stored in the storage device after correction of the positional information.

4. The image recognition apparatus as claimed in claim 1, wherein
    the determiner identifies an ultimate determination of whether each of the plurality of road signs is for the own lane of the own vehicle based on a majority of results of repeated determinations.

5. The image recognition apparatus as claimed in claim 1, wherein the traffic lane recognizer recognizes a type of each of the traffic lanes based on the image information,
    wherein the traffic lane information includes positional information about each of the traffic lanes recognized by the traffic lane recognizer,
    wherein the storage device stores the traffic lane information including the type of each of the traffic lanes recognized by the traffic lane recognizer,
    wherein the determiner is configured to:
        compare positional information about each of the plurality of road signs with the positional information about each of the traffic lanes recognized by the traffic lane recognizer to choose one traffic lane for each road sign to correspond to; and
        determine that at least one of the plurality of road signs is for the own lane when determining that the traffic lane corresponding to the at least one of the plurality of road signs is the own lane or an adjacent lane that is adjacent to the own lane.

6. An image recognition method executed by an image recognition apparatus installed in a vehicle, the method comprising the steps of:
    acquiring image information by repeatedly capturing an image of a traveling path along which an own vehicle travels in a given cycle as an image information acquisition step;
    recognizing a plurality of road signs located along the traveling path based on the image information as a road sign recognition step;
    recognizing traffic lanes in the traveling path based on the image information as a traffic lane recognition step;
    storing, in a storage device, traffic lane information about the traffic lanes recognized along the traffic lane recognition step in a time series as a storage step;
    recognizing a road sign located along the traveling path;
    determining that a branch lane included in the traffic lanes is not recognized;
    determining that a time period has elapsed since the traffic lane recognizer has last recognized the branch lane;
    detecting a traffic lane among the traffic lanes that is located a shortest distance from the road sign;
    determining that the road sign is an own road sign that corresponds to an own lane of the own vehicle and not the branch lane; and displaying, on a display device, the own road sign of the own lane,
wherein
the image recognition apparatus serves as a driver assistance system that performs driver assistance.

\* \* \* \* \*